(12) United States Patent
Seo

(10) Patent No.: US 11,149,951 B2
(45) Date of Patent: Oct. 19, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Jaewon Seo, Changwon-si (KR)

( * ) Notice: Subject to any disclaimer, the term of this patent is extended or adjusted under 35 U.S.C. 154(b) by 221 days.

(21) Appl. No.: 16/134,653

(22) Filed: Sep. 18, 2018

(65) Prior Publication Data
US 2019/0107282 A1  Apr. 11, 2019

(30) Foreign Application Priority Data
Oct. 11, 2017  (KR) .......................... 10-2017-0130057

(51) Int. Cl.
*F23R 3/14* (2006.01)
*F02C 3/04* (2006.01)
(Continued)

(52) U.S. Cl.
CPC ................. *F23R 3/14* (2013.01); *F02C 3/04* (2013.01); *F23C 1/08* (2013.01); *F23C 7/004* (2013.01);
(Continued)

(58) Field of Classification Search
CPC ................. F23D 11/103; F23D 11/105; F23D 2900/14021; F23D 2900/14701;
(Continued)

(56) References Cited

U.S. PATENT DOCUMENTS

| 6,026,645 A | 2/2000 | Stokes et al. |
| 2007/0057090 A1* | 3/2007 | Labelle .................. F23C 7/004 239/418 |

(Continued)

FOREIGN PATENT DOCUMENTS

| JP | 2005-180799 A | 7/2005 |
| JP | 2010-159951 A | 7/2010 |
| KR | 10-2011-0041096 A | 4/2011 |

OTHER PUBLICATIONS

A Korean Office Action dated Jan. 10, 2019 in connection with Korean Patent Application No. 10-2017-0130057 which corresponds to the above-referenced U.S. application.

*Primary Examiner* — Gerald L Sung
*Assistant Examiner* — Jacek Lisowski
(74) *Attorney, Agent, or Firm* — Harvest IP Law, LLP

(57) ABSTRACT

In a combustor including a plurality of combustion nozzles, and a gas turbine including the same, fuel can be uniformly mixed with compressed air for each combustion nozzle. The combustor includes a plurality of combustion nozzles arranged in a nozzle casing, and each combustion nozzle includes a nozzle shroud for taking in compressed air; an injection cylinder concentrically disposed in the nozzle shroud and configured to be supplied with fuel for mixing with the compressed air; and a plurality of swirlers circumferentially arranged around the injection cylinder and configured to inject the fuel from the injection cylinder into the shroud. The plurality of swirlers divide an interior space of the nozzle shroud into a plurality of fluid flow regions, and include a pair of adjacent swirlers spaced apart from each other by a circumferential distance that differs from a circumferential distance between another pair of adjacent swirlers.

10 Claims, 8 Drawing Sheets

(51) Int. Cl.
*F23R 3/28* (2006.01)
*F23C 7/00* (2006.01)
*F23D 14/24* (2006.01)
*F23C 1/08* (2006.01)

(52) U.S. Cl.
CPC .............. *F23D 14/24* (2013.01); *F23R 3/286* (2013.01); *F05D 2240/35* (2013.01); *F23C 2900/07001* (2013.01); *F23D 2900/00008* (2013.01)

(58) Field of Classification Search
CPC .. F23D 2900/07001; F23D 14/24; F23C 7/04; F23C 7/22; F23C 1/08; F23R 3/28; F23R 3/286; F05D 2240/35; F02C 3/04
See application file for complete search history.

(56) References Cited

U.S. PATENT DOCUMENTS

| | | | |
|---|---|---|---|
| 2010/0170255 A1* | 7/2010 | Zuo | F23R 3/286 60/748 |
| 2010/0263383 A1* | 10/2010 | York | F23R 3/283 60/748 |
| 2013/0219898 A1* | 8/2013 | Nakamura | F02C 7/22 60/737 |
| 2016/0186662 A1 | 6/2016 | Stewart | |
| 2017/0130962 A1 | 5/2017 | Inoue et al. | |

* cited by examiner

COMBUSTOR AND GAS TURBINE INCLUDING THE SAME

CROSS-REFERENCE TO RELATED APPLICATIONS

This application claims priority to Korean Patent Application No. 10-2017-0130057, filed on Oct. 11, 2017, the disclosure of which is incorporated herein by reference in its entirety.

BACKGROUND OF THE INVENTION

Field of the Invention

Exemplary embodiments of the present disclosure relate to a combustor and a gas turbine including the same.

Description of the Related Art

A gas turbine is a power engine that mixes air compressed in a compressor with fuel for combustion and rotates a turbine by high-temperature gas produced by the combustion. The gas turbine is used to drive a generator, an aircraft, a ship, a train, etc.

SUMMARY OF THE INVENTION

An object of the present disclosure is to provide a combustor including a combustion nozzle in which fuel can be uniformly mixed with compressed air, and a gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a combustor including a plurality of combustion nozzles arranged in a nozzle casing. Each combustion nozzle may include a nozzle shroud for taking in compressed air; an injection cylinder concentrically disposed in the nozzle shroud and configured to be supplied with fuel for mixing with the compressed air; and a plurality of swirlers circumferentially arranged around the injection cylinder and configured to inject the fuel from the injection cylinder into the shroud, the plurality of swirlers including a pair of adjacent swirlers spaced apart from each other by a circumferential distance that differs from a circumferential distance between another pair of adjacent swirlers of the plurality of swirlers.

The plurality of swirlers may divide an interior space of the nozzle shroud into a plurality of fluid flow regions; an amount of compressed air may be lean in one of the plurality of fluid flow regions compared to another fluid flow region among the plurality of fluid flow regions; and the one fluid flow region may be smaller than the other fluid flow region.

The combustion nozzles may include a central nozzle centrally disposed in the nozzle casing; and a plurality of outer nozzles arranged along an imaginary annular line surrounding the central nozzle. In each of the outer nozzles, the one fluid flow region may be adjacent to the central nozzle, and the other fluid flow region may be adjacent to an inner peripheral surface of the nozzle casing.

Each of the swirlers may have a plurality of fuel injection holes for injecting the fuel from the injection cylinder into the shroud.

In accordance with another aspect of the present disclosure, there is provided a combustor including a plurality of combustion nozzles arranged in a nozzle casing, and each combustion nozzle may include the above nozzle shroud; the above injection cylinder; and a plurality of swirlers circumferentially arranged around the injection cylinder, each swirler having a plurality of fuel injection holes for injecting the fuel from the injection cylinder into the shroud, wherein an amount of fuel injected through the fuel injection holes formed in one swirler of the plurality of swirlers differs from an amount of fuel injected through the fuel injection holes formed in another swirler of the plurality of swirlers.

The plurality of swirlers may divide an interior space of the nozzle shroud into a plurality of fluid flow regions; an amount of compressed air may be lean in one of the plurality of fluid flow regions compared to another fluid flow region among the plurality of fluid flow regions; and an amount of fuel injected from a swirler positioned in the one fluid flow region may be less than an amount of fuel injected from a swirler positioned in the other fluid flow region.

In accordance with another aspect of the present disclosure, there is provided a gas turbine including a compressor to compress air, a combustor to mix the compressed air with fuel to produce combustion gas by combusting the mixture, and a turbine having a rotor configured to be rotated by the combustion gas. The combustor of the gas turbine is consistent with the combustor as described above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
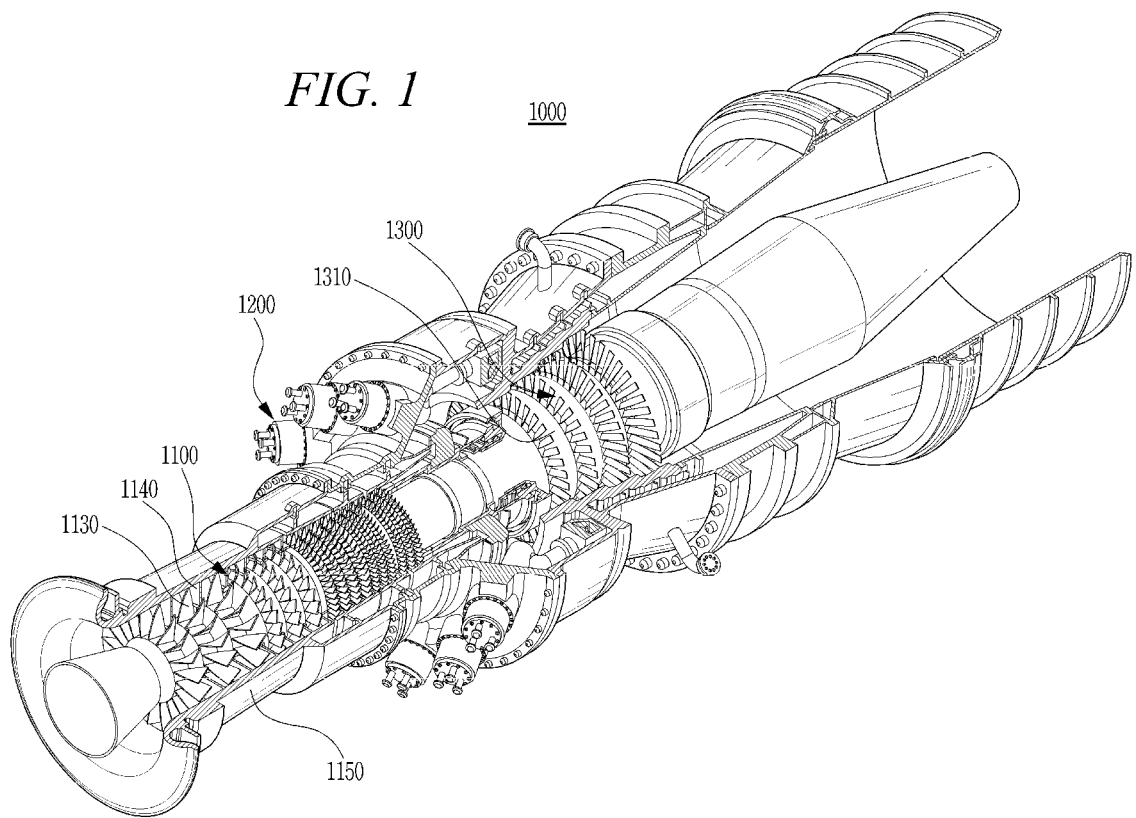
FIG. 1 is a cutaway perspective view of a gas turbine according to a first embodiment of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a gas turbine according to a first embodiment of the present disclosure will be described with reference to FIGS. 1 to 5.

Figure 2:
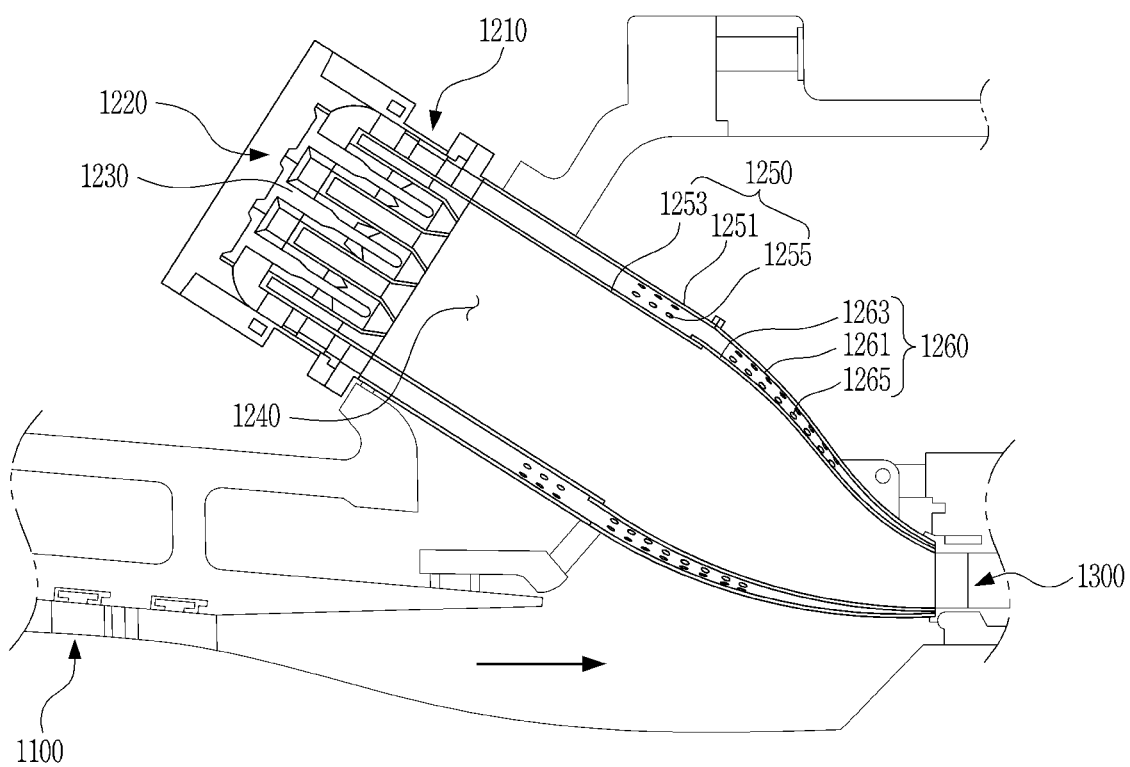
FIG. 2 is a schematic cross-sectional view of a combustor according to the first embodiment of the present disclosure.
Figure 3:
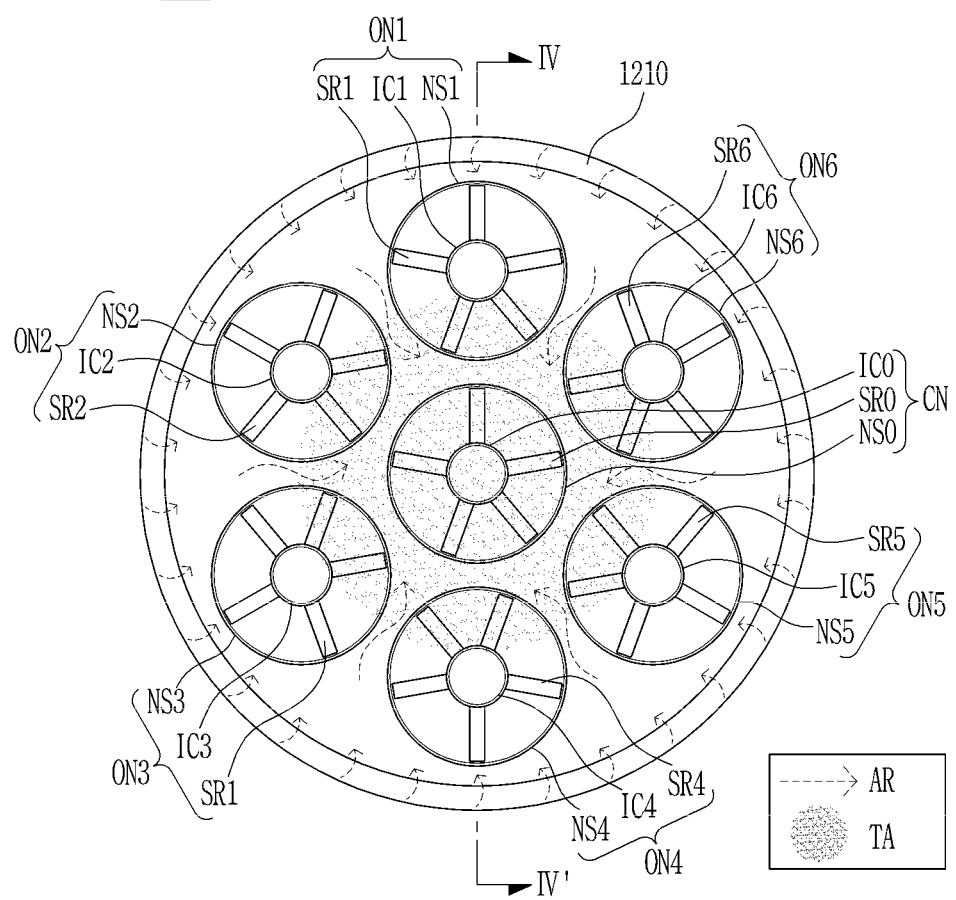
FIG. 3 is a top view of a plurality of combustion nozzles arranged in the combustor of FIG. 2.
Figure 4:
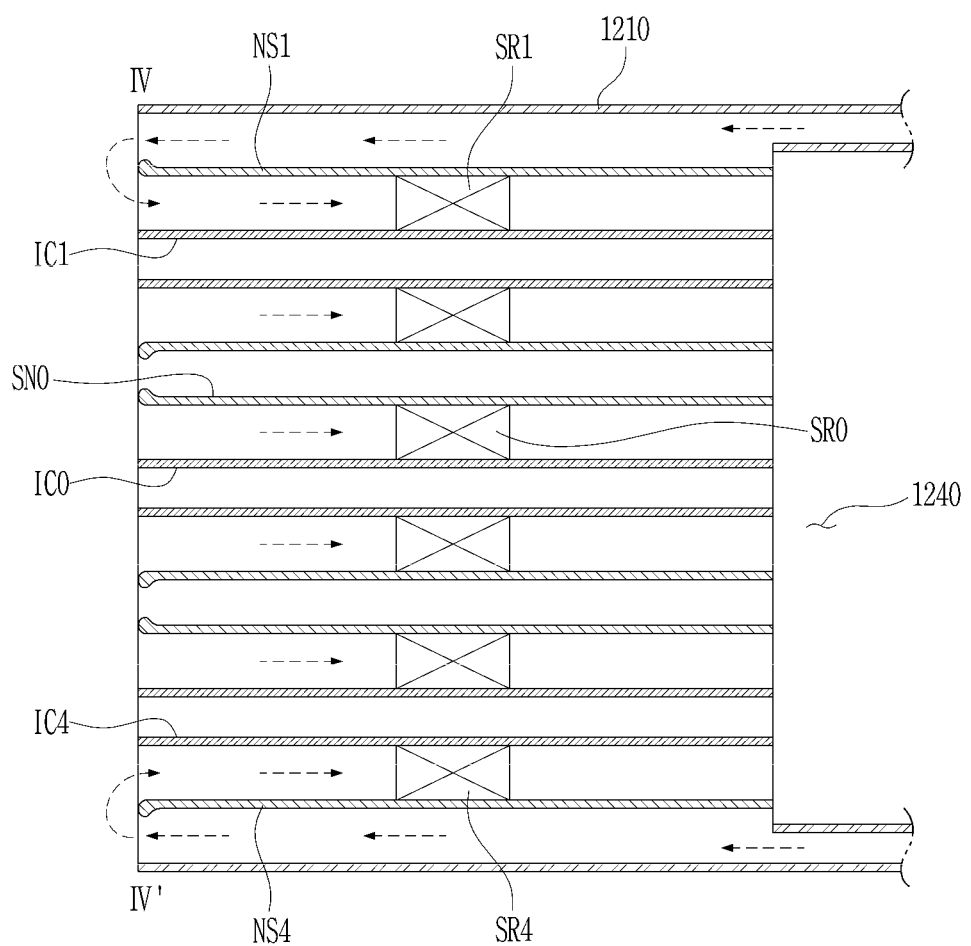
FIG. 4 is a cross-sectional view taken along line IV-IV' of FIG. 3.

FIG. 1 illustrates the interior of a gas turbine according to a first embodiment of the present disclosure, and FIG. 2 shows a combustor of FIG. 1. FIGS. 3 and 4 illustrate a plurality of combustion nozzles in the combustor shown in FIG. 2, with FIG. 5 detailing one combustion nozzle.

Referring to FIGS. 1 to 5, a gas turbine 1000 according to the present embodiment may include a compressor 1100, a combustor 1200, and turbine 1300. In the combustor 1200 that mixes compressed air with fuel for combustion according to the present embodiment, a plurality of swirlers SR1 to SR6 are arranged on the outer peripheral surface of each of injection cylinders IC1 to IC6 of a plurality of respective outer nozzles ON1 to ON6 arranged in a nozzle casing 1210. From among the swirlers SR1 to SR6, the distance between a pair of adjacent swirlers may differ from the distance between another pair of adjacent swirlers. In detail, the swirlers are arranged such that the distance between a pair of swirlers disposed in a region where compressed air is lean is shorter than the distance between a pair of swirlers disposed in a region where compressed air is relatively rich, thereby enabling a mixing ratio of fuel and compressed air to be kept uniform in both of the regions.

The thermodynamic cycle of the gas turbine 1000 according to the present embodiment may ideally follow a Brayton cycle. The Brayton cycle may consist of four phases including isentropic compression (adiabatic compression), isobaric heat addition, isentropic expansion (adiabatic expansion), and isobaric heat dissipation. In other words, in the Brayton cycle, thermal energy is released by combustion of fuel in an isobaric environment after the atmospheric air is sucked and compressed to a high pressure, hot combustion gas is expanded to be converted into kinetic energy, and exhaust gas with residual energy is then discharged to the atmosphere. The Brayton cycle may consist of four processes, i.e., compression, heating, expansion, and exhaust.

The gas turbine 1000 using the above Brayton cycle may include a compressor, a combustor, and a turbine. Although the following description is given with reference to FIG. 1, the present disclosure may be widely applied to a gas turbine having the same or similar configuration as the gas turbine 1000.

Referring to FIG. 1, the compressor 1100 of the gas turbine 1000 may suck air from the outside and compress the air. The compressor 1100 may supply air compressed by compressor blades 1130 to the combustor 1200 and supply cooling air to a high-temperature region required for cooling in the gas turbine 1000. In this case, the pressure and temperature of air passing through the compressor 1100 increase since the air sucked into the compressor 1100 undergoes an adiabatic compression process.

The compressor 1100 is designed as a centrifugal compressor or a multistage axial compressor. The centrifugal compressor is applied to a small gas turbine, whereas the multistage axial compressor 1100 is typically applied to the large gas turbine 1000 as illustrated in FIG. 1 because it is necessary to compress a large amount of air. In the multistage axial compressor 1100, the compressor blades 1130 rotate along with the rotation of a compressor rotor disk to compress the introduced air while delivering compressed air to rear-stage compressor vanes 1140. Air is compressed increasingly to a high pressure while passing through compressor blades 1130 formed in a multistage manner.

Compressor vanes 1140 are mounted in a housing 1150 and may be formed in a multistage manner. The compressor vanes 1140 guide the compressed air delivered from front-stage compressor blades 1130 to rear-stage compressor blades 1130. In the present embodiment, at least some of the multistage compressor vanes 1140 may be mounted to be rotatable within a fixed range for regulating an inflow rate of air or the like.

The compressor 1100 may be driven by some of the power output from the turbine 1300. To this end, the rotary shaft of the compressor 1100 may be directly connected to the rotary shaft of the turbine 1300. In the large gas turbine 1000, the compressor 1100 may require about half of the power generated in the turbine 1300 to be driven. Accordingly, improving the efficiency of the compressor 1100 has a direct influence on an improvement in overall efficiency of the gas turbine 1000.

The combustor 1200 may mix the compressed air, which is supplied from the outlet of the compressor 1100, with fuel for isobaric combustion to produce high-energy combustion gas. FIG. 2 illustrates an example of one combustor 1200 included in the gas turbine 1000.

The combustor 1200 according to the present embodiment is disposed downstream of the compressor 1100, and may include a plurality of burners 1220, a plurality of liners 1250, and a plurality of transition pieces 1260. For a given combustor 1200 as shown in FIG. 2, a combustion chamber 1240 is formed by the liner 1250 longitudinally connected to the transition piece 1260. The combustion chamber 1240 and the burner 1220 coupled thereto may form a combustion can in the combustor 1200. That is, the combustor 1200 may include a plurality of combustion cans.

The burners 1220 may be arranged along a plurality of annular nozzle casings 1210. In detail, the burners 1220 may be respectively disposed in the nozzle casings 1210 that are spaced apart from each other along an imaginary annular line. Each of the burners 1220 includes a plurality of combustion nozzles 1230, and the fuel injected from the combustion nozzles 1230 is mixed with air at an appropriate ratio to be suitable for combustion.

The gas turbine 1000 may use gas fuel, liquid fuel, or a combination thereof (e.g., composite fuel). It is important to make a combustion environment for reducing an amount of emissions such as carbon monoxide or nitrogen oxide that is subject to legal regulations. Thus, pre-mixed combustion has been increasingly used in recent years in that it can lower combustion temperature and accomplish uniform combustion to reduce emissions even though it is relatively difficult to control combustion.

In the pre-mixed combustion used for the gas turbine 1000 according to the present embodiment, compressed air is pre-mixed with the fuel injected from the combustion nozzles 1230 and then introduced into the combustion chamber 1240.

Referring to FIGS. 3 and 4, the combustion nozzles 1230 are arranged in each of the nozzle casings 1210, and may include a central nozzle CN and a plurality of outer nozzles ON1 to ON6.

The central nozzle CN is disposed at the center of the nozzle casing 1210. Fuel may be mixed with compressed air in the central nozzle CN and the mixture may be injected into the combustion chamber 1240. In this case, the central nozzle CN may include a nozzle shroud NS0, an injection cylinder IC0, and a plurality of swirlers SR0.

The nozzle shroud NS0 is a member that surrounds the injection cylinder IC0 and the swirlers SR0, and may extend in a direction in which compressed air and fuel are injected.

The injection cylinder IC0 is disposed at the center of the nozzle shroud NS0, and may be connected to a fuel injector (not shown) to be supplied with the fuel required for combustion. The injection cylinder IC0 may extend in parallel with the nozzle shroud NS0.

The swirlers SR0 may be arranged on the outer peripheral surface of the injection cylinder IC0 to inject fuel into the nozzle shroud NS0. The fuel injected into the nozzle shroud NS0 by the swirlers SR0 may be mixed with the compressed air introduced into the nozzle shroud NS0. In this case, the compressed air and the fuel may be swirled by the swirlers SR0 in the nozzle shroud NS0. As such, the swirlers SR0 enable the compressed air to be uniformly mixed with the fuel in the nozzle shroud NS0.

The swirlers NS0 may be circumferentially spaced apart from each other. Each of the swirlers SR0 may have a plurality of fuel injection holes H1 or H2 (see FIGS. 7A and 7B), and the fuel supplied to the injection cylinder IC0 may be injected into the nozzle shroud NS0 through the fuel injection holes H1 and H2. Consequently, the compressed air introduced into the nozzle shroud NS0 is mixed with the fuel injected through the fuel injection holes H1 and H2 of the swirlers SR0.

The outer nozzles ON1 to ON6 may be arranged to surround the central nozzle CN in the nozzle casing 1210. In this case, the outer nozzles ON1 to ON6 may be spaced apart from each other and be disposed adjacent to the inner peripheral surface of the nozzle casing 1210. Similar to the central nozzles CN, fuel may be mixed with compressed air in the outer nozzles ON1 to ON6 and the mixture may be injected into the combustion chamber 1240. Although six outer nozzles ON1 to ON6 are illustrated as being arranged around the central nozzle CN in FIG. 3, the present disclosure is not necessarily limited to a particular number of outer nozzles ON1 to ON6 and more or fewer outer nozzles may be provided.

Each of the outer nozzles ON1 to ON6 may include a nozzle shroud NS1, NS2, NS3, NS4, NS5, or NS6, an injection cylinder IC1, IC2, IC3, IC4, IC5, or IC6, and a plurality of swirlers SR1, SR2, SR3, SR4, SR5, or SR6.

The nozzle shroud NS1, NS2, NS3, NS4, NS5, or NS6 is a member that surrounds the injection cylinder IC1, IC2, IC3, IC4, IC5, or IC6 and the swirlers SR1, SR2, SR3, SR4, SR5, or SR6, and may extend in a direction in which compressed air and fuel are injected.

The injection cylinder IC1, IC2, IC3, IC4, IC5, or IC6 is disposed at the center of the nozzle shroud NS1, NS2, NS3, NS4, NS5, or NS6, and may be connected to a fuel injector (not shown) to be supplied with the fuel required for combustion. The injection cylinder IC1, IC2, IC3, IC4, IC5, or IC6 may extend in parallel with the nozzle shroud NS1, NS2, NS3, NS4, NS5, or NS6.

The swirlers SR1, SR2, SR3, SR4, SR5, or SR6 may be arranged on the outer peripheral surface of the injection cylinder IC1, IC2, IC3, IC4, IC5, or IC6 to inject fuel into the nozzle shroud NS1, NS2, NS3, NS4, NS5, or NS6. The fuel injected into the nozzle shroud NS1, NS2, NS3, NS4, NS5, or NS6 by the swirlers SR1, SR2, SR3, SR4, SR5, or SR6 may be mixed with the compressed air introduced into the nozzle shroud NS1, NS2, NS3, NS4, NS5, or NS6. In this case, the compressed air and the fuel may be swirled by the swirlers SR1, SR2, SR3, SR4, SR5, or SR6 in the nozzle shroud NS1, NS2, NS3, NS4, NS5, or NS6. As such, the swirlers SR1, SR2, SR3, SR4, SR5, or SR6 enable the compressed air to be uniformly mixed with the fuel in the nozzle shroud NS1, NS2, NS3, NS4, NS5, or NS6.

The swirlers NS1, NS2, NS3, NS4, NS5, or NS6 may be circumferentially spaced apart from each other. Each of the swirlers SR1, SR2, SR3, SR4, SR5, or SR6 may have a plurality of fuel injection holes H1 or H2 (see FIGS. 7A and 7B), and the fuel supplied to the injection cylinder IC1, IC2, IC3, IC4, IC5, or IC6 may be injected into the nozzle shroud NS1, NS2, NS3, NS4, NS5, or NS6 through the fuel injection holes H1 and H2. Consequently, the compressed air introduced into the nozzle shroud NS1, NS2, NS3, NS4, NS5, or NS6 is mixed with the fuel injected through the fuel injection holes H1 and H2 of the swirlers SR1, SR2, SR3, SR4, SR5, or SR6.

Referring to FIGS. 2 and 3, the compressed air AR in the compressor 1100 may flow to each of the burners 1220 along an annular space between an associated inner transition piece 1263 and an associated outer transition piece 1261 and an annular space between an associated inner liner 1253 and an associated outer liner 1251, and be introduced into an associated one of the nozzle casings 1210. The compressed air AR introduced along the annular space between the inner liner 1253 and the outer liner 1251 may be introduced into the nozzle casing 1210, and then flow to the central nozzle CN and outer nozzles ON1 to ON6 which are arranged in the nozzle casing 1210. Then, the compressed air AR may be introduced into the central nozzle CN and the outer nozzles ON1 to ON6, i.e., nozzle shrouds NS0 to NS6.

In this case, the compressed air AR is introduced into the central nozzle CN and the outer nozzles ON1 to ON6, but the same amount of compressed air may not be introduced into each of the central nozzle CN and the outer nozzles ON1 to ON6. Amounts of introduced compressed air may differ from each other according to nozzle position.

In more detail, the amounts of compressed air introduced into the outer nozzles ON1 to ON6 adjacent to the circumference of the nozzle casing 1210, into which the compressed air AR is introduced, may be larger than the amount of compressed air introduced into the central nozzle CN. That is, compared to other positions in the nozzle casing 1210, an amount of compressed air may be lean in a region TA, which includes the region of the central nozzle CN and adjacent regions.

In addition, in each of the outer nozzles ON1 to ON6, amounts of compressed air may differ from each other according to position. For example, in one of the outer nozzles ON1 to ON6, an amount of compressed air may be lean in a region close to the central nozzle CN compared to in other regions.

Figure 5:
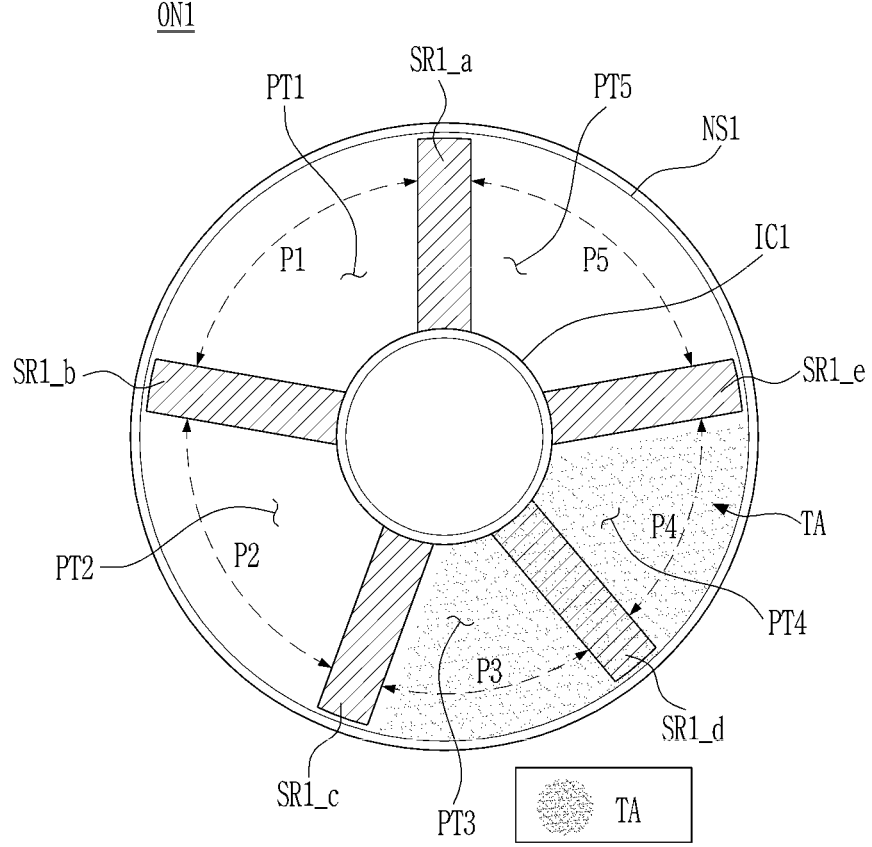
FIG. 5 is a top view of one of the combustion nozzles of FIG. 3.

In more detail, referring to FIG. 5, the interior space of the nozzle shroud NS1 of the outer nozzle ON1 may include a plurality of fluid flow regions PT1 to PT5. The interior space is divided into partitions, namely, the fluid flow regions PT1 to PT5, by the swirlers SR1_a to SR1_e. the fluid flow region PT1 may be defined as a region between the swirler SR1_a and the swirler SR1_b, the fluid flow region PT2 may be defined as a region between the swirler SR1_b and the swirler SR1_c, the fluid flow region PT3 may be defined as a region between the swirler SR1_c and the swirler SR1_d, the fluid flow region PT4 may be defined as a region between the swirler SR1_d and the swirler SR1_e, and the fluid flow region PT5 may be defined as a region between the swirler SR1_e and the swirler SR1_a.

In the nozzle shroud NS1 of the outer nozzle ON1, the amounts of compressed air introduced into the fluid flow regions PT3 and PT4 adjacent to the central nozzle CN may be lean compared to those introduced into the other fluid flow regions PT1, PT2, and PT5. Although the amount of compressed air is described as being relatively lean in the fluid flow regions PT3 and PT4 in the present embodiment, it may also be lean in the region from the fluid flow regions PT2 to the fluid flow region PT5.

Mixing ratios of compressed air and fuel injected from the outer nozzles ON1 to ON6 and the central nozzle CN must be equal to each other. If the mixing ratios of compressed air and fuel injected from the outer nozzles ON1 to ON6 and the central nozzle CN differ from each other, an amount of emissions such as carbon monoxide or nitrogen oxide may be increased.

Accordingly, the mixing ratio of compressed air and fuel needs to be uniform in each of the fluid flow regions PT1 to PT5 of the internal space of the nozzle shrouds NS1 to NS6 partitioned by the swirlers SR1_a to SR1_e in each of the outer nozzles ON1 to ON6.

In the present embodiment, in order for the mixing ratio of compressed air and fuel to be kept uniform in each of the fluid flow regions PT1 to PT5, the swirlers SR1_a to SR1_e may be arranged such that the distance between a pair of adjacent swirlers differs from the distance between another pair of adjacent swirlers.

In more detail, the swirlers may be arranged such that the distance between a pair of swirlers disposed in a region TA in which an amount of introduced compressed air is lean is shorter than the distance between another pair of swirlers.

As illustrated in FIG. 5, the swirlers may be arranged such that the region PT3 between a pair of swirlers SR1_c and SR1_d and the region PT4 between a pair of swirlers SR1_d and SR1_e, which are regions TA in which an amount of compressed air is lean, are smaller than the region PT1 between a pair of swirlers SR1_a and SR1_b, the region PT2 between a pair of swirlers SR1_b and SR1_c, and the region PT5 between a pair of swirlers SR1_e and SR1_a.

When the distance between a pair of swirlers disposed in the region TA in which an amount of compressed air is lean is shorter than the distance between a pair of swirlers that are not disposed in the region TA, it is possible to uniformly maintain a mixing ratio of fuel and compressed air passing through each of the fluid flow regions PT1, PT2, and PT5. In this case, the mixing ratio may be kept uniform by reducing the distance between a pair of swirlers in a region in which an amount of compressed air is lean since the amounts of fuel injected into the respective fluid flow regions PT1, PT, and PT5 are equal to each other.

Referring to FIG. 2 again, the liners 1250 are disposed downstream of the respective burners 1220, and compressed air and fuel injected from the combustion nozzles 1230 of each of the burners 1220 may be combusted in the combustion chamber 1240 formed in an associated one of the liners 1250. In this case, since the liners 1250 are coupled to the respective burners 1220 arranged along an imaginary annular line, the liners 1250 may be arranged along the imaginary annular line.

Each of the liners 1250 may have a double structure formed by the inner liner 1253 and the outer liner 1251. That is, the liner may have a double structure in which the outer liner 1251 surrounds the inner liner 1253. Here, the inner liner 1253 is a hollow tubular member, and fuel and compressed air are combusted in the internal space of the inner liner 1253, i.e., in the combustion chamber 1240.

Each of the transition pieces 1260 is disposed downstream of the associated liner 1250, and high-pressure gas produced in the liner 1250 may be discharged from the transition piece 1260 to the turbine 1300. The transition piece 1260 may have a double structure formed by the inner transition piece 1263 and the outer transition piece 1261. That is, the transition piece may have a double structure in which the outer transition piece 1261 surrounds the inner transition piece 1263. The inner transition piece 1263 is a hollow tubular member similar to the inner liner 1253, but it may have a diameter reduced gradually from the liner 1250 to the turbine 1300.

In this case, the inner liner 1253 may be coupled to the inner transition piece 1263 by a plate spring seal (not shown). Since the ends of the inner liner 1253 and the inner transition piece 1263 are fixed to the combustor 1200 and the turbine 1300, respectively, the plate spring seal must have a structure that is capable of corresponding to length and diameter extension by thermal expansion to support the inner liner 1253 and the inner transition piece 1263.

The combustor 1200 needs to be suitably cooled since it operates at the highest temperature in the gas turbine 1000. Compressed air flows along the outer surfaces of the liner 1250 and transition piece 1260, in which hot combustion gas flows, to be supplied to the combustion nozzles 1230. In this process, the liner 1250 and transition piece 1260 heated by the hot combustion gas are suitably cooled.

The gas turbine 1000 according to the present embodiment has a structure in which the outer liner 1251 and the outer transition piece 1261 respectively surround the inner liner 1253 and the inner transition piece 1263. Compressed air may permeate into the annular space between the inner liner 1253 and the outer liner 1251 and the annular space between the inner transition piece 1263 and the outer transition piece 1261. The inner liner 1253 and the inner transition piece 1263 may be cooled by the compressed air permeated into these annular spaces.

The outer transition piece 1261 surrounding the inner transition piece 1263 may have a plurality of first cooling holes 1265. The first cooling holes 1265 are holes penetrating the outer transition piece 1261, and the air (hereinafter referred to as a "jet flow") having passed through the first cooling holes 1265 may vertically impinge on the outer peripheral surface of the inner transition piece 1263 to cool the inner transition piece 1263.

The outer liner 1251 surrounding the inner liner 1253 may have a plurality of second cooling holes 1255. The second cooling holes 1255 are holes penetrating the outer liner 1251, and the jet flow having passed through the second cooling holes 1255, similar to the above first cooling holes 1265, may vertically impinge on the outer peripheral surface of the inner liner 1253 to cool the inner liner 1253.

Meanwhile, the high-temperature and high-pressure combustion gas produced in the combustor 1200 is supplied to the turbine 1300 through the liner 1250 and the transition piece 1260. In the turbine 1300, the combustion gas applies impingement or reaction force to a plurality of turbine blades 1310 radially arranged on the rotary shaft of the turbine 1300 while adiabatically expanding, thereby converting the thermal energy of the combustion gas into mechanical energy for rotation of the rotary shaft. Some of the mechanical energy obtained in the turbine 1300 is supplied as energy required for compression of air in the compressor, and the remainder is used as effective energy required for driving a generator to produce electric power or the like.

Hereinafter, a gas turbine 1000 according to a second embodiment of the present disclosure will be described.

Figure 6:
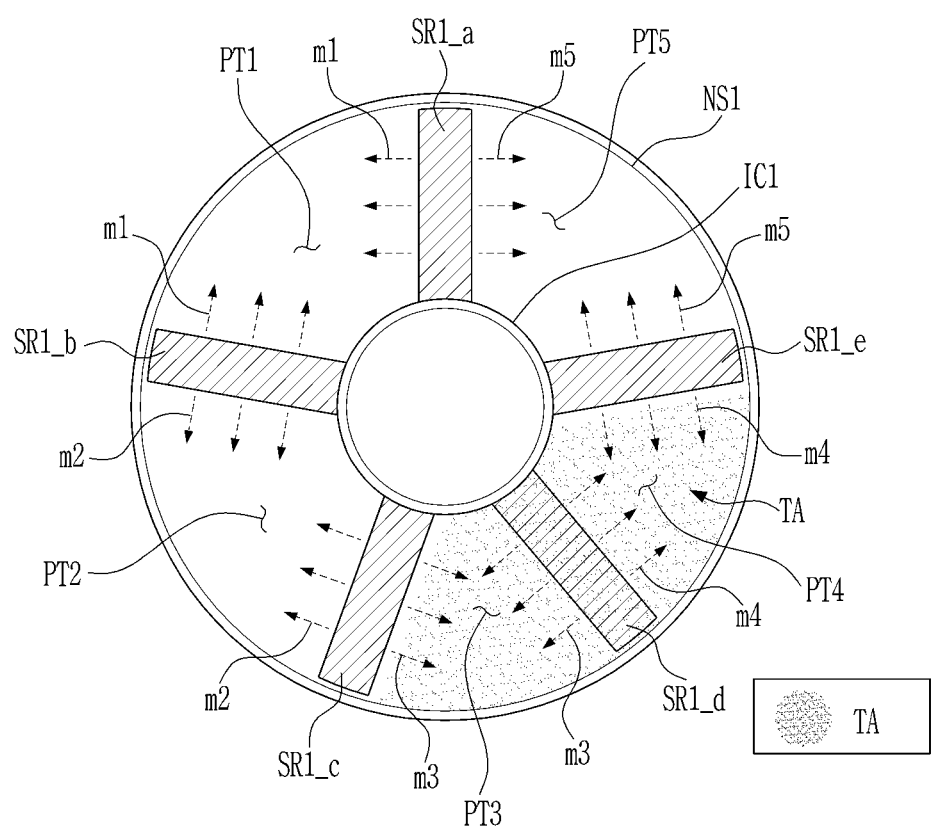
FIG. 6 is a top view of one of the combustion nozzles of a combustor according to a second embodiment of the present disclosure.
Figure 7A:
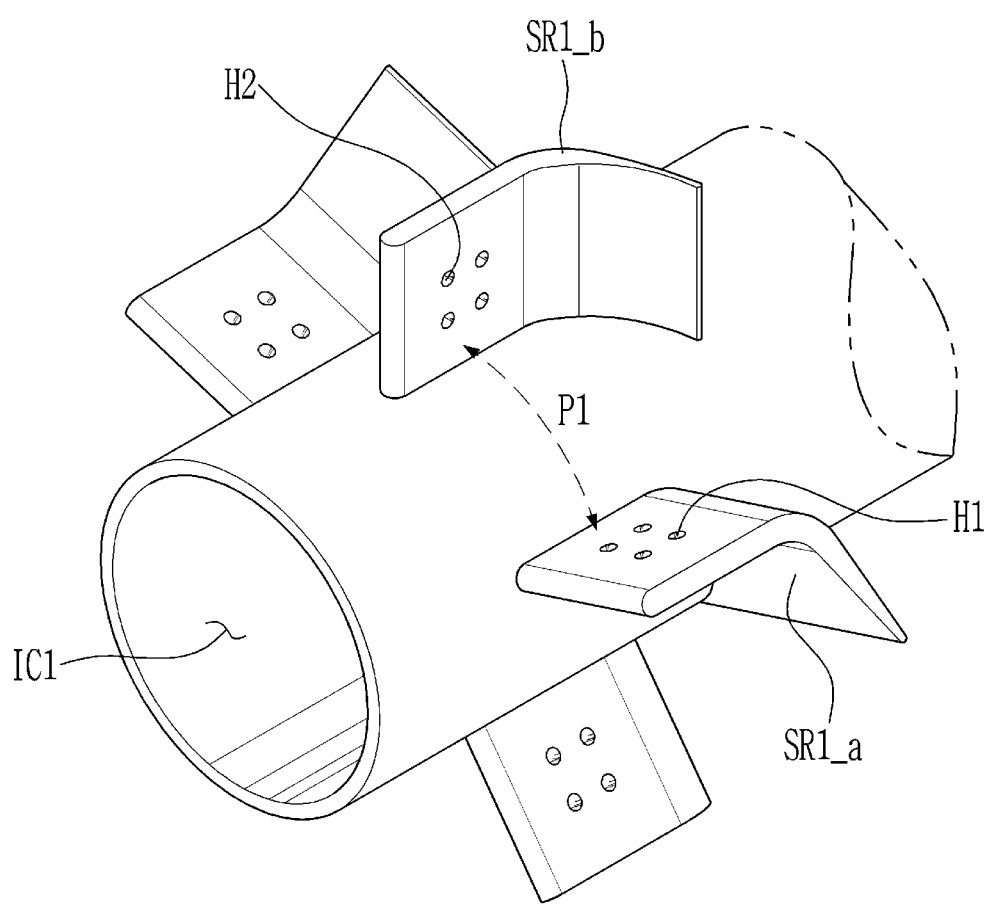
FIG. 7A is a perspective view of an injection cylinder to which swirlers are coupled within one nozzle shroud.
Figure 7B:
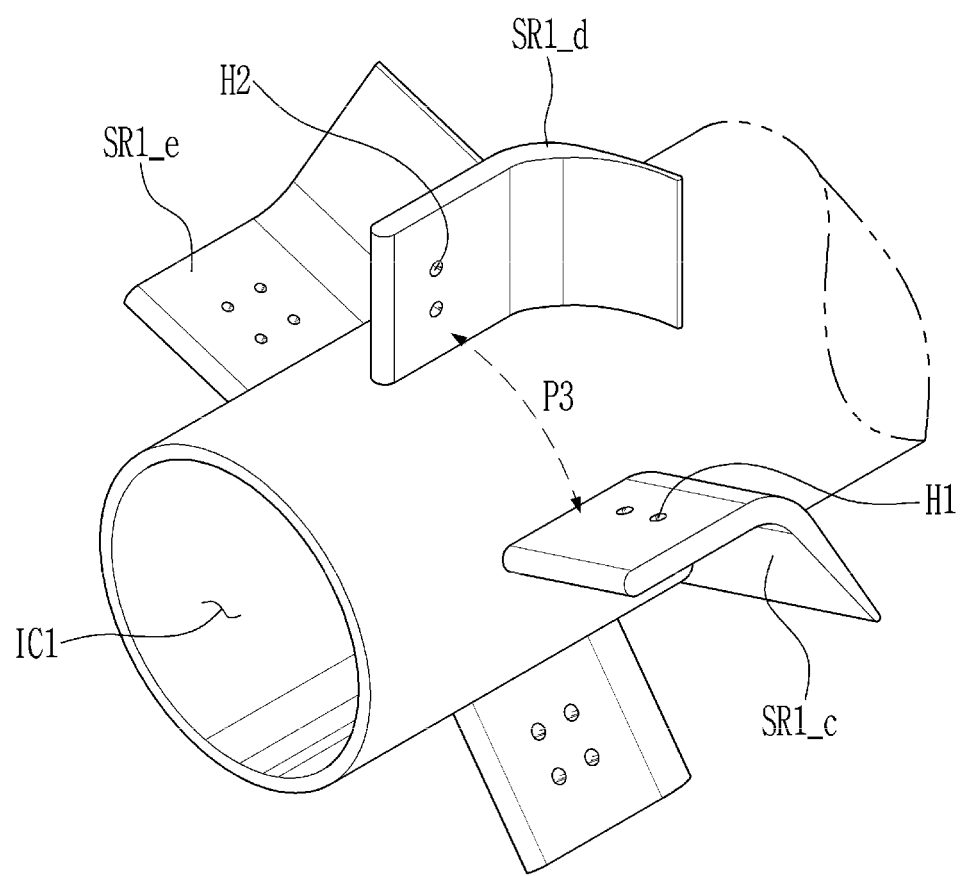
FIG. 7B is a rear perspective view of the injection cylinder of FIG. 7A.

FIG. 6 illustrates one combustion nozzle disposed in a combustor according to a second embodiment of the present disclosure. FIGS. 7A and 7B illustrate a state in which swirlers are coupled to an injection cylinder in one nozzle shroud.

Referring to FIG. 6, the combustor according to the second embodiment of the present disclosure has primarily the same structure as the gas turbine according to the above-described first embodiment. The second embodiment differs in terms of the configuration of a plurality of fuel injection holes H1 and H2. Description of the corresponding structure will therefore be omitted.

In the second embodiment, fluid flow regions PT3 and PT4 correspond to regions TA in which an amount of compressed air is lean. Here, among the outer nozzles ON1 to ON6, the injection amounts of fuel m3 and m4 injected into the fluid flow regions PT3 and PT4 are smaller than the injection amounts of fuel m1, m2, and m5 injected into the other fluid flow regions PT1, PT2, and PT5. That is, the amount of fuel injected into a region in which an amount of compressed air is lean may be smaller (less) than those injected into other regions.

In more detail, the injection amounts of fuel m3 and m4 injected into the fluid flow regions PT3 and PT4 through the swirlers SR1_c, SR1_d, and SR1_e are smaller than the injection amounts of fuel m1, m2, and m5 injected into the other fluid flow regions PT1, PT2, and PT5 through the swirlers SR1_a, SR1_b, SR1_c, and SR1_e. However, since the swirler SR1_c allows fuel to be injected into the fluid flow regions PT2 and PT3 to which different amounts of compressed air are supplied, the swirler SR1_c may be adjusted such that different amounts of fuel are injected into the fluid flow regions PT2 and PT3. Similarly, since the swirler SR1_e allows fuel to be injected into the fluid flow regions PT4 and PT5 to which different amounts of compressed air are supplied, the swirler SR1_e may be adjusted such that different amounts of fuel are injected into the fluid flow regions PT4 and PT5.

Meanwhile, referring to FIG. 7B, there may be smaller and/or fewer fuel injection holes H1 and H2 formed in the surfaces of the swirlers SR1_c, SR1_d, and SR1_e facing the fluid flow regions PT3 and PT4 corresponding to regions TA in which an amount of compressed air is lean. That is, it is possible to control an injection amount of fuel by adjusting the size and/or number of fuel injection holes H1 and H2 formed in the swirlers SR1_c, SR1_d, and SR1_e.

It is possible to uniformly maintain a mixing ratio of compressed air and fuel by reducing the amounts of fuel injected into the fluid flow regions PT3 and PT4 corresponding to regions TA in which an amount of compressed air is lean.

As is apparent from the above description, in accordance with the combustor and the gas turbine of the present disclosure, fuel can be uniformly mixed with compressed air in the combustion nozzle.

Although the present disclosure has been described with respect to the specific embodiments, it will be apparent to those skilled in the art that various variations and modifications may be made by adding, changing, or removing components without departing from the spirit and scope of the disclosure as defined in the following claims, and these variations and modifications fall within the spirit and scope of the disclosure as defined in the appended claims.

While the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A combustor including a plurality of combustion nozzles arranged in a nozzle casing, each combustion nozzle comprising:

a nozzle shroud for taking in compressed air;

an injection cylinder concentrically disposed in the nozzle shroud and configured to be supplied with fuel for mixing with the compressed air; and a plurality of swirlers circumferentially arranged around the injection cylinder and configured to divide an interior mace of the nozzle shroud into a plurality of fluid flow regions such that each swirler of the plurality of swirlers is disposed between two adjacent fluid flow regions of the plurality of fluid flow regions, said each swirler having a plurality of fuel injection holes for injecting an amount of the fuel from the injection cylinder into each of the two adjacent fluid flow regions, wherein the plurality of fluid flow regions include a first fluid flow region and a remainder of the plurality of fluid flow regions that excludes the first fluid flow region, the remainder of the plurality of fluid flow regions including a second fluid flow region, the first fluid flow region being smaller than the second fluid flow region, wherein each of the plurality of fluid flow regions is configured to receive an amount of the compressed air, the amount of the compressed air in the first flow region being lean compared to the amount of the compressed air in the second flow region, wherein the plurality of swirlers include a first swirler having a first circumferential side in which first fuel injection holes of the plurality of fuel injection holes are formed and a second circumferential side in which second fuel injection holes of the plurality of fuel injection holes are formed, the first circumferential side of the first swirler facing the first fluid flow region and the second circumferential side of the first swirler facing the second fluid flow region, and a second swirler having a third circumferential side in which third fuel injection holes of the plurality of fuel injection holes are formed, the third circumferential side of the second swirler facing the second fluid flow region, wherein the plurality of swirlers are configured to inject less of the fuel into the first fluid flow region in which the amount of the compressed air is lean than into the second fluid flow region, by forming the first fuel injection holes in the first circumferential side of the first swirler to include at least one of the first fuel injection holes that are smaller in size than the second fuel injection holes formed in the second circumferential side of the first swirler, the first fuel injection holes being smaller in size than the third fuel injection holes formed in the third circumferential side of the second swirler, and the first fuel injection holes that are fewer in number than the second fuel injection holes formed in the second circumferential side of the first swirler, the first fuel, injection holes being fewer in number than the third fuel injection holes formed in the third circumferential side of the second swirler, wherein a number of the first fuel injection holes in the first circumferential side of the first swirler and a number of the second fuel injection holes in the second circumferential side of the first swirler is different, and a number of the second fuel injection holes in the second circumferential side of the first swirler and a number of the third fuel injection holes in the third circumferential side of the second swirler is same, and wherein a size of the first fuel injection holes in the first circumferential side of the first swirler and a size of the second fuel injection holes in the second circumferential side of the first swirler is different, and a size of the second fuel injection holes in the second circumferential side of the first swirler and a size of the third fuel injection holes in the third circumferential side of the second swirler is same.

2. The combustor according to claim 1,
wherein the number of the third fuel injection holes formed in the third circumferential side of the second swirler facing the second fluid flow region is same as a number of fuel injection holes formed in opposite side of the third circumferential side of the second swirler, and
wherein the size of the third fuel injection holes formed in the third circumferential side of the second swirler facing the second fluid flow region is same as a size of fuel injection holes formed in opposite side of the third circumferential side of the second swirler.

3. The combustor according to claim 1,
wherein the plurality of swirlers further include a third swirler having fifth and sixth circumferential sides each facing the first fluid flow region, and
wherein the number and the size of the fuel injection holes of the fifth circumferential side of the third swirler equal the number and the size of the fuel injection holes of the sixth circumferential side of the third swirler.

4. The combustor according to claim 1,
wherein the plurality of combustion nozzles comprise:
a central nozzle centrally disposed in the nozzle casing; and
a plurality of outer nozzles arranged along an imaginary annular line surrounding the central nozzle,
wherein the first fluid flow region in each of the plurality of outer nozzles is adjacent to the central nozzle, and
wherein the remainder of the plurality of fluid flow regions in each of the plurality of outer nozzles are adjacent to an inner peripheral surface of the nozzle casing.

5. The combustor according to claim 1,
wherein the plurality of swirlers include a pair of adjacent swirlers spaced apart from each other by a circumferential distance that differs from a circumferential distance between another pair of adjacent swirlers of the plurality of swirlers, and
wherein the pair of adjacent swirlers includes the first swirler and the second swirler.

6. A gas turbine comprising a compressor to compress air, a combustor to mix the compressed air with fuel to produce combustion gas by combusting the mixture, and a turbine having a rotor configured to be rotated by the combustion gas, the combustor including a plurality of combustion nozzles arranged in a nozzle casing, each combustion nozzle comprising:
a nozzle shroud for taking in the compressed air;
an injection cylinder concentrically disposed in the nozzle shroud and configured to be supplied with the fuel for mixing with the compressed air; and
a plurality of swirlers circumferentially arranged around the injection cylinder and configured to divide an interior space of the nozzle shroud into a plurality of fluid flow regions such that each swirler of the plurality of swirlers is disposed between two adjacent fluid flow regions of the plurality of fluid flow regions, said each swirler having a plurality of fuel injection holes for injecting an amount of the fuel from the injection cylinder into each of the two adjacent fluid flow regions,
wherein the plurality of fluid flow regions include a first fluid flow region and a remainder of the plurality of fluid flow regions that excludes the first fluid flow region, the remainder of the plurality of fluid flow regions including a second fluid flow region, the first fluid flow region being smaller than the second fluid flow region,
wherein each of the plurality of fluid flow regions is configured to receive an amount of the compressed air, the amount of the compressed air in the first flow region being lean compared to the amount of the compressed air in the second flow region,
wherein the plurality of swirlers include
a first swirler having a first circumferential side in which first fuel injection holes of the plurality of fuel injection holes are formed and a second circumferential side in which second fuel injection holes of the plurality of fuel injection holes are formed, the first circumferential side of the first swirler facing the first fluid flow region and the second circumferential side of the first swirler facing the second fluid flow region, and
a second swirler having a third circumferential side in which third fuel injection holes of the plurality of fuel injection holes are formed, the third circumferential side of the second swirler facing the second fluid flow region,
wherein the plurality of swirlers are configured to inject less of the fuel into the first fluid flow region in which the amount of the compressed air is lean than into the second fluid flow region, by forming the first fuel injection holes in the first circumferential side of the first swirler to include at least one of
the first fuel injection holes that are smaller in size than the second fuel injection holes formed in the second circumferential side of the first swirler, the first fuel injection holes being smaller in size than the third fuel injection holes formed in the third circumferential side of the second swirler, and the first fuel injection holes that are fewer in number than the second fuel injection holes formed in the second circumferential side of the first swirler, wherein the first swirler includes a third circumferential side facing the second fluid flow region and the second swirler includes a fourth circumferential side facing the first fluid flow region, the first fuel, injection holes being fewer in number than the third fuel injection holes formed in the third circumferential side of the second swirler, wherein a number of the first fuel injection holes in the first circumferential side of the first swirler and a number of the second fuel injection holes in the second circumferential side of the first swirler is different, and a number of the second fuel injection holes in the second circumferential side of the first swirler and a number of the third fuel injection holes in the third circumferential side of the second swirler is same, and wherein a size of the first fuel injection holes in the first circumferential side of the first swirler and a size of the second fuel injection holes in the second circumferential side of the first swirler is different, and a size of the second fuel injection holes in the second circumferential side of the first swirler and a size of the third fuel injection holes in the third circumferential side of the second swirler is same.

7. The gas turbine according to claim 6,
wherein the number of the third fuel injection holes formed in the third circumferential side of the second swirler facing the second fluid flow region is same as a number of fuel injection holes formed in opposite side of the third circumferential side of the second swirler, and wherein the size of the third fuel injection holes formed in the third circumferential side of the second swirler facing the second fluid flow region is same as a size of fuel injection holes formed in opposite side of the third circumferential side of the second swirler.

8. The gas turbine according to claim 6,
wherein the plurality of swirlers further include a third swirler having fifth and sixth circumferential sides each facing the first fluid flow region, and wherein the number and the size of the fuel injection holes of the fifth circumferential side of the third swirler equal the number and the size of the fuel injection holes of the sixth circumferential side of the third swirler.

9. The gas turbine according to claim 6,
wherein the plurality of combustion nozzles comprise:
    a central nozzle centrally disposed in the nozzle casing; and
    a plurality of outer nozzles arranged along an imaginary annular line surrounding the central nozzle, wherein the first fluid flow region in each of the plurality of outer nozzles is adjacent to the central nozzle, and wherein the remainder of the plurality of fluid flow regions in each of the plurality of outer nozzles are adjacent to an inner peripheral surface of the nozzle casing.

10. The gas turbine according to claim 6,
wherein the plurality of swirlers include a pair of adjacent swirlers spaced apart from each other by a circumferential distance that differs from a circumferential distance between another pair of adjacent swirlers of the plurality of swirlers, and wherein the pair of adjacent swirlers includes the first swirler and the second swirler.

\* \* \* \* \*